Figure 1:
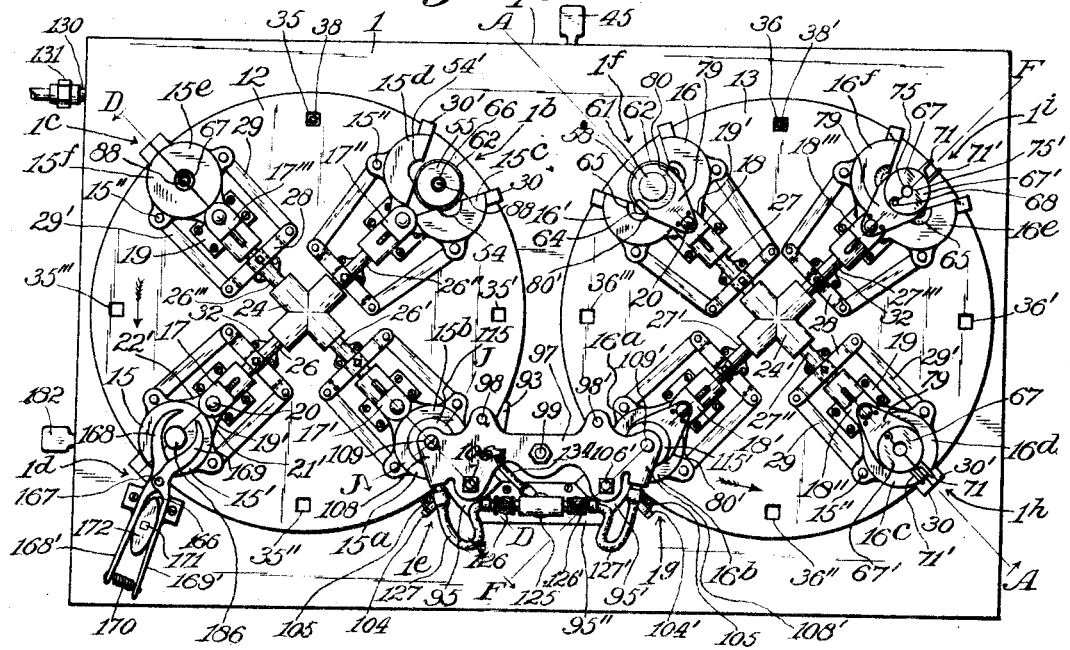

J. B. GRAHAM & F. R. MILLER.
MEANS FOR PRODUCING BOTTLES.
APPLICATION FILED JUNE 2, 1910.

1,189,811.

Patented July 4, 1916.
8 SHEETS—SHEET 1.

WITNESSES:
J. H. Gardner
K. R. Woddell

INVENTORS:
Joseph B. Graham,
Frank R. Miller,
By E. T. Silvius,
ATTORNEY.

J. B. GRAHAM & F. R. MILLER.
MEANS FOR PRODUCING BOTTLES.
APPLICATION FILED JUNE 2, 1910.
1,189,811.
Patented July 4, 1916.
8 SHEETS—SHEET 2.
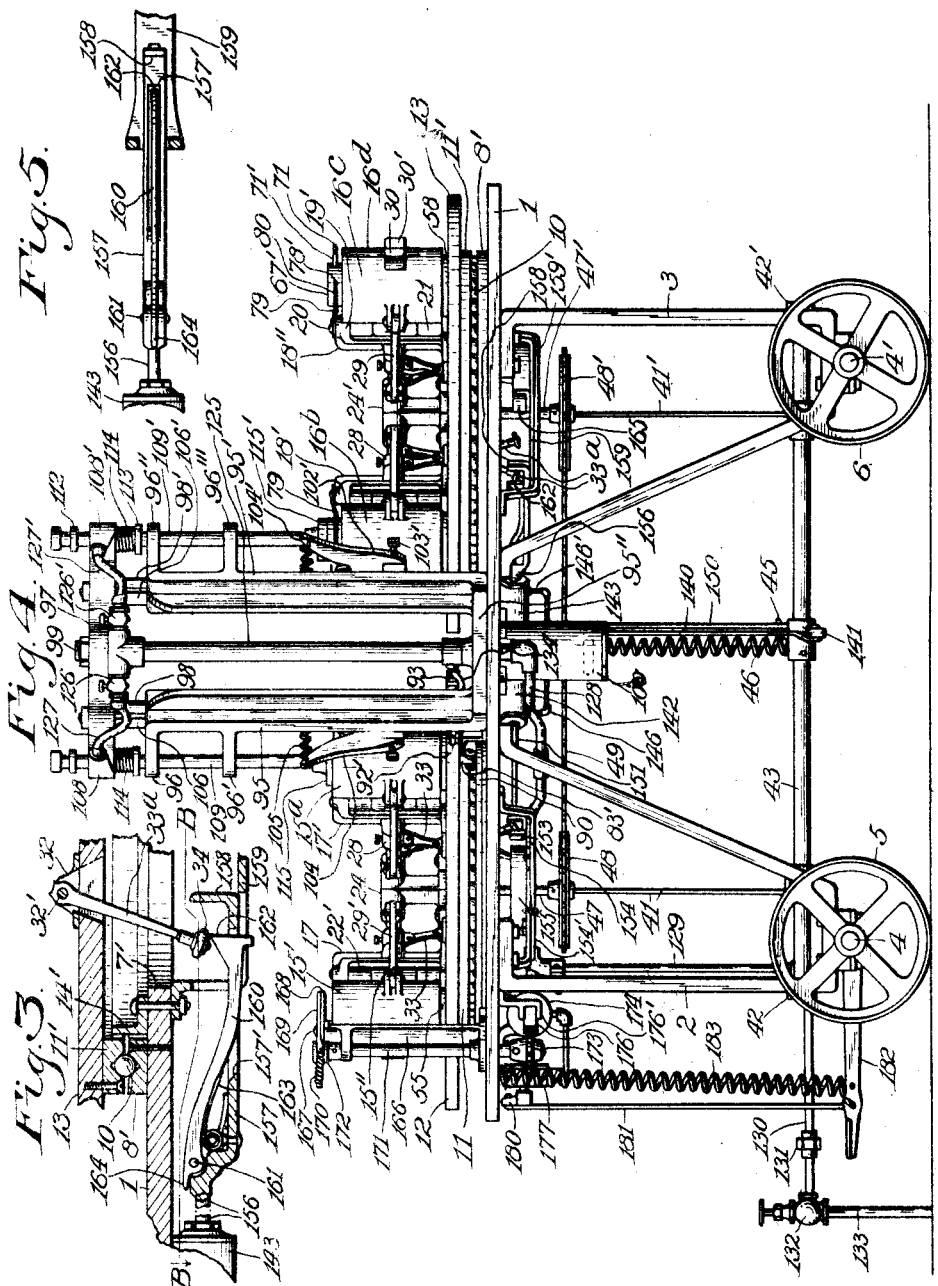
WITNESSES:
J. H. Gardner
K. R. Woddell
INVENTORS:
Joseph B. Graham
Frank R. Miller,
By
E. T. Silvius,
ATTORNEY.

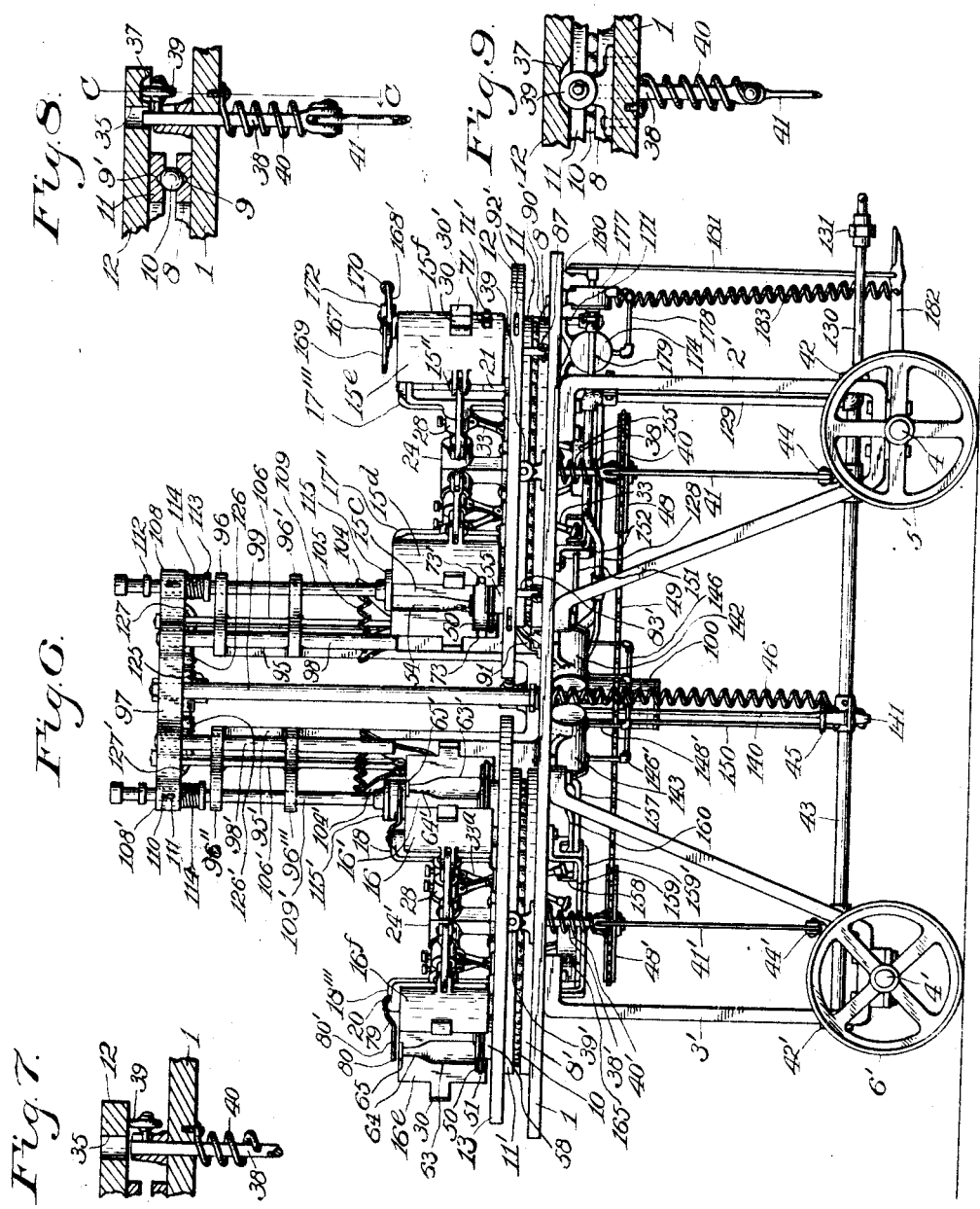

J. B. GRAHAM & F. R. MILLER.
MEANS FOR PRODUCING BOTTLES.
APPLICATION FILED JUNE 2, 1910.
1,189,811.
Patented July 4, 1916.
8 SHEETS—SHEET 4.
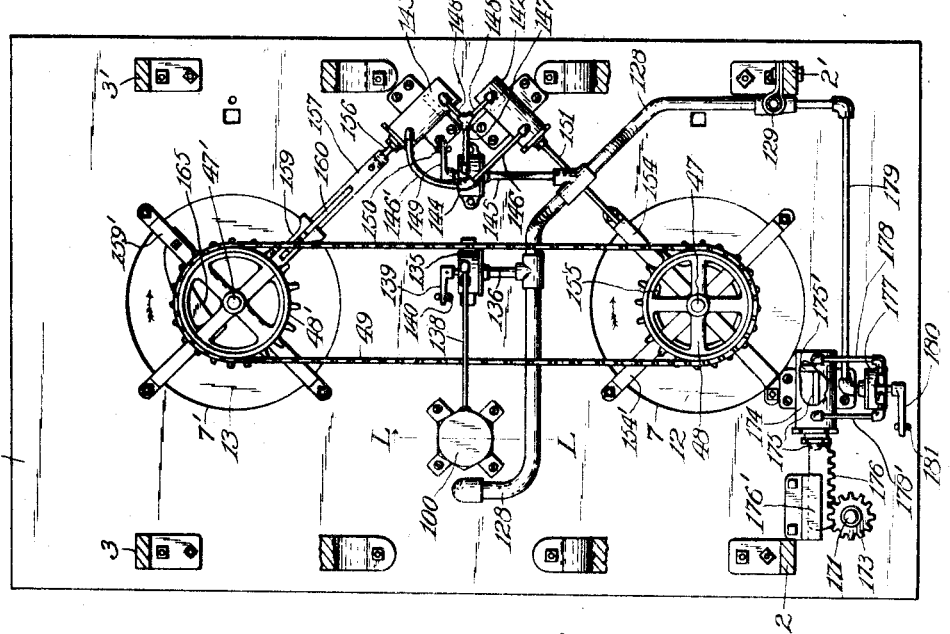
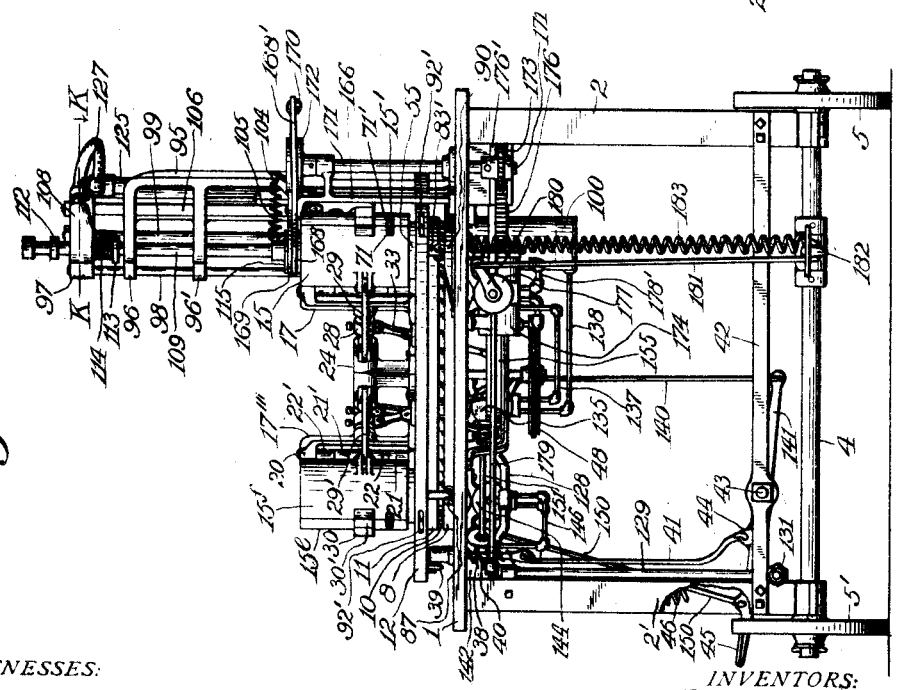
WITNESSES:
J. H. Gardner
K. R. Woddell
INVENTORS:
Joseph B. Graham,
Frank R. Miller
By E. T. Silvius,
ATTORNEY.

J. B. GRAHAM & F. R. MILLER.
MEANS FOR PRODUCING BOTTLES.
APPLICATION FILED JUNE 2, 1910.
1,189,811.
Patented July 4, 1916
8 SHEETS—SHEET 5.
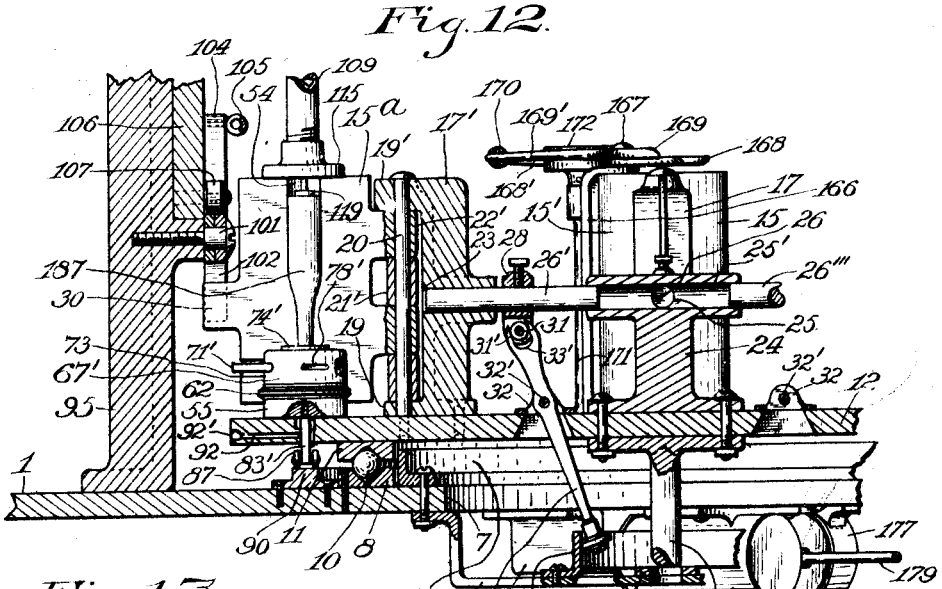
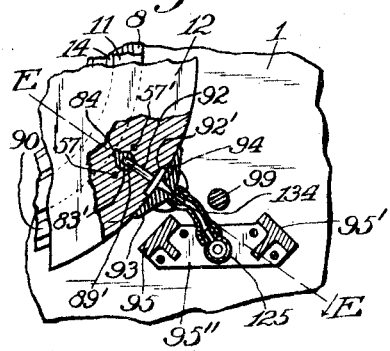
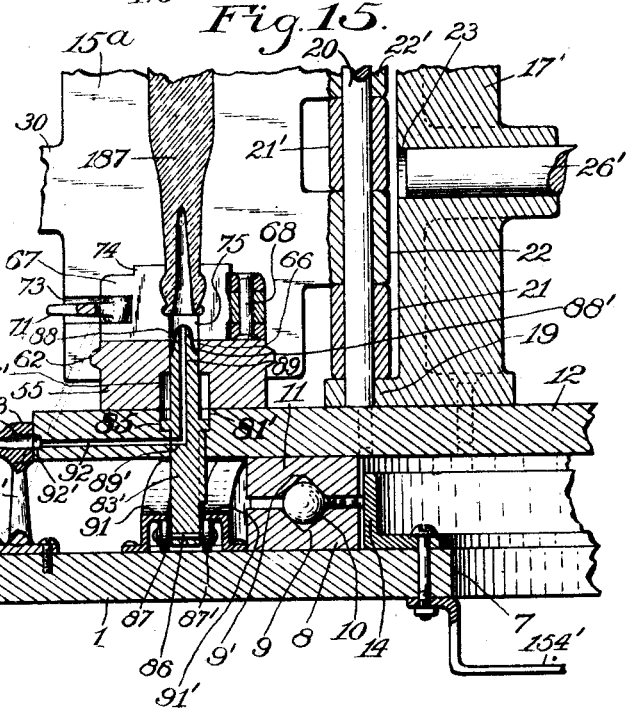
WITNESSES:
J. H. Gardner
K. R. Woddell
INVENTORS:
Joseph B. Graham,
Frank R. Miller.
By E. T. Silvius,
ATTORNEY.

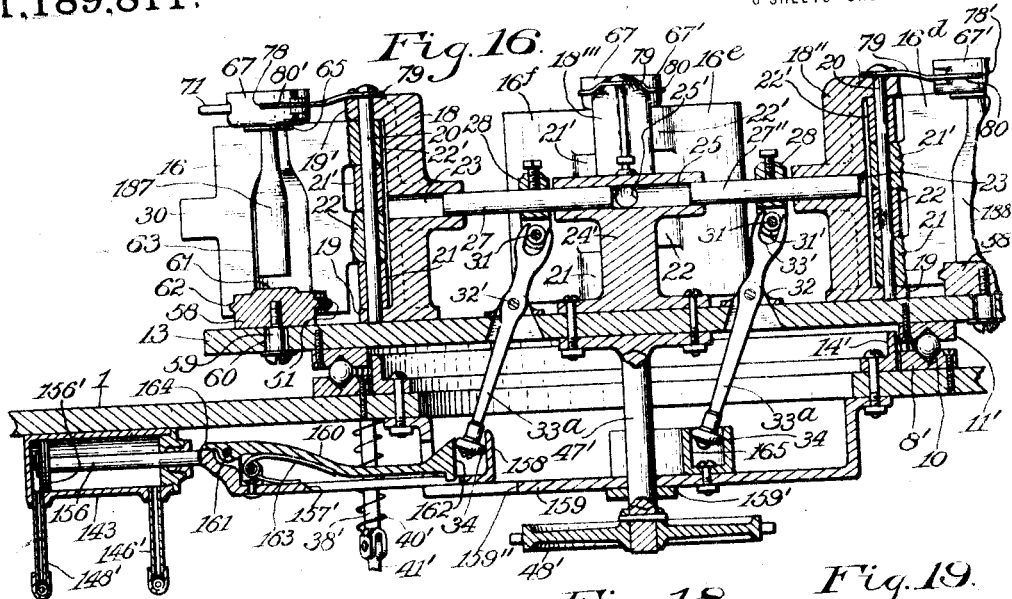

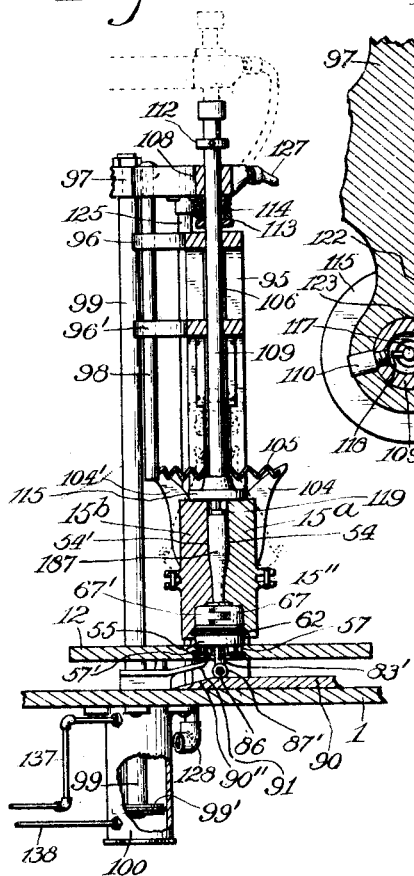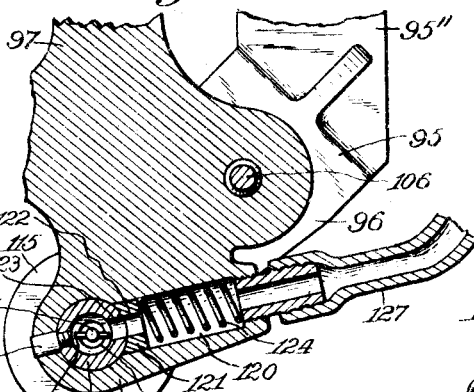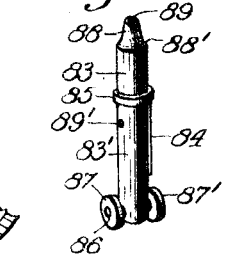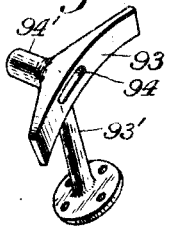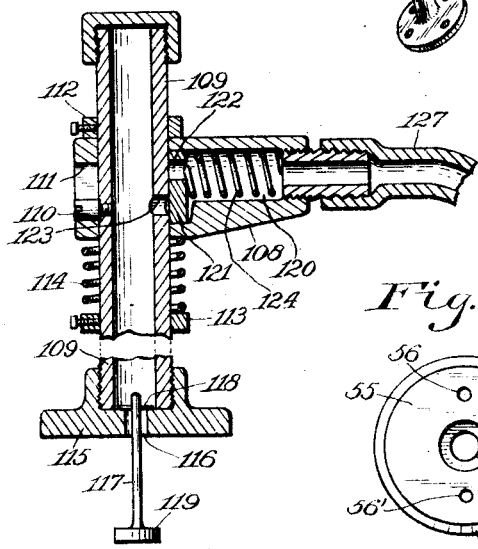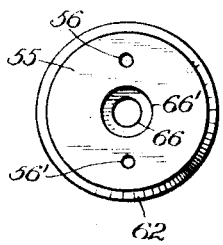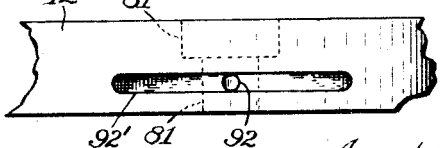

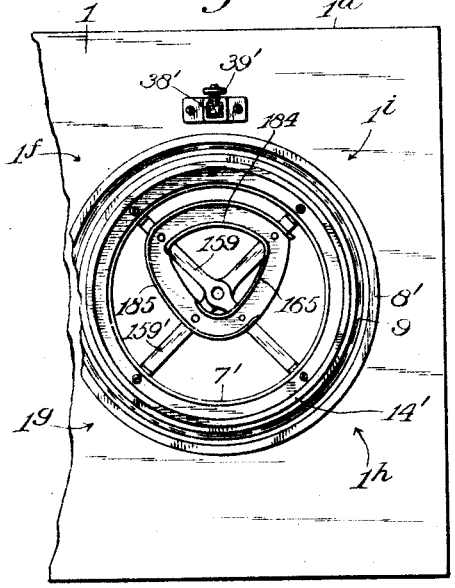
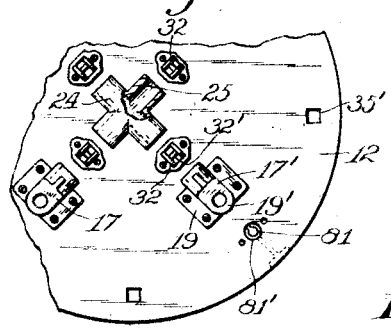
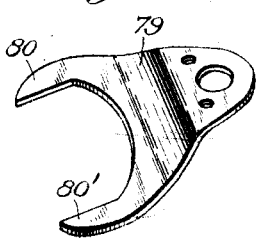
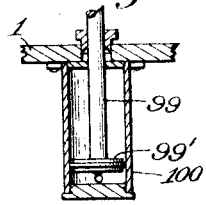
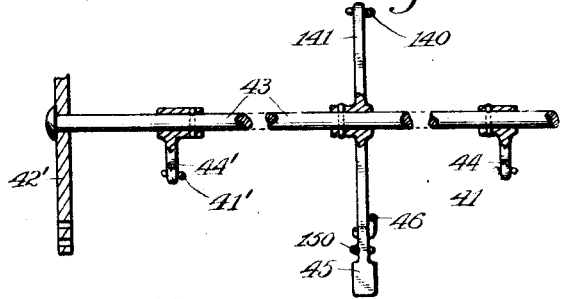

UNITED STATES PATENT OFFICE.

JOSEPH B. GRAHAM AND FRANK R. MILLER, OF LOOGOOTEE, INDIANA, ASSIGNORS, BY DIRECT AND MESNE ASSIGNMENTS, TO GRAHAM BOTTLE MACHINE COMPANY, A CORPORATION OF INDIANA.

MEANS FOR PRODUCING BOTTLES.

1,189,811.   Specification of Letters Patent.   Patented July 4, 1916.

Application filed June 2, 1910. Serial No. 564,552.

*To all whom it may concern:*

Be it known that we, JOSEPH B. GRAHAM and FRANK R. MILLER, citizens of the United States, residing at Loogootee, in the county of Martin and State of Indiana, have invented certain new and useful Improvements in Means for Producing Bottles; and we do declare the following to be a full, clear, and exact description of the invention, reference being had to the accompanying drawings, and to the letters and figures of reference marked thereon, which form a part of this specification.

This invention relates to multiple-mold machines for the manufacture of glass bottles or other vessels and has reference more particularly to the manufacture of narrow-neck bottles, the invention relating especially to the parison-molds and the finishing-molds and the apparatus for accomplishing the blowing operations, and to various other features of construction.

An important object of the invention is to provide a complete bottle blowing machine that will be adapted to be operated expeditiously at the minimum expense, especially for manual labor, to the end that the glass ware may be produced at the lowest possible cost.

Another object is to provide a machine that shall invariably produce true and smooth mouths and throats in the bottle necks, without requiring re-heating and subsequent finishing operations.

A further object is to provide a bottle-blowing machine which shall produce symmetrical and uniformly strong lower portions of bottles and without flaws or blemishes, a specific object being to enable the machine to mold and blow the bottom of the lower portion of the bottle with substantially uniform thickness of wall and without working of the end of the parison as a distinct operation, the aim being to eliminate hand movements with the exercise of manual skill, and to avoid loss of time required for special manipulations.

A still further object is to provide improved apparatus for cutting off the metal as it is placed in the parison mold from the remnant remaining on the gathering rod, to the end that the parison may be of nearly uniform proportion and that the cutting off may be performed expeditiously and effectively.

The invention has also for its object to provide means for operating and controlling various movable parts of the machine which shall be adapted to be controlled by one operator in order to eliminate the expense of assistants for the operator.

With the above mentioned and minor objects in view, the invention broadly comprises a plurality of rotatable mold tables on one of which a plurality of parison molds are mounted, and on the other one of which a plurality of finishing molds or blow-molds are mounted; novel dual blowing apparatus for simultaneously blowing and molding the parison and bottle neck in a parison-mold and blowing or finishing a bottle in a finishing mold; improved apparatus for locking the mold tables in the required positions for blowing operations, means for preventing blowing operations when either one of the tables remains unlocked, means for automatically locking the mold parts together preceding the blowing operations and unlocking them automatically after the blowing operations are accomplished; improved mouth and throat molds and also improved neck molds for shaping the necks externally; apparatus for automatically closing the finishing molds simultaneously with the closing of the parison molds, and an improved mechanically operated parison clipper.

The invention consists also in certain methods of manufacture, and in certain novel features of construction and in the combinations and arrangements of parts, as hereinafter particularly described and claimed.

Figure 2:
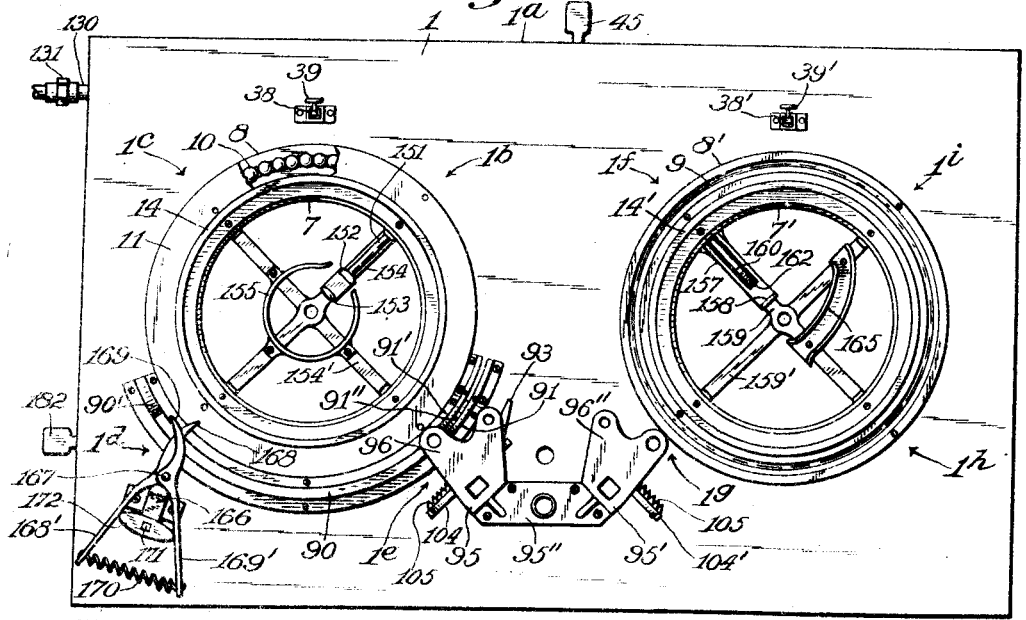

Referring to the drawings, Figure 1 is a top plan of a machine embodying the improvements; Fig. 2, a top plan of the supporting bench of the mold tables showing parts obscured in the preceding figure; Fig. 3, a fragmentary vertical section showing operative parts approximately on the plane of the line A A in Fig. 1; Fig. 4, an elevation of the rear side of the machine; Fig. 5, a fragmentary horizontal section on the line B B in Fig. 3; Fig. 6, an elevation of the front side of the machine; Fig. 7, a fragmentary section showing the construction of the table locks, the table being unlocked; Fig. 8, a fragmentary section showing a table in locked arrangement; Fig. 9, a vertical section approximately on the line C C in Fig. 8; Fig. 10, an elevation of the head end of the machine; Fig. 11, an inverted horizontal section of the bench, being a plan of the mechanism on the under side of the bench top; Fig. 12, a fragmentary vertical section approximately on the line D D in Fig. 1; Fig. 13, a fragmentary horizontal section near the plane of the mold tables with a portion of the parison-mold table thereon and partially broken away; Fig. 14, a fragmentary section also on the line D D in Fig. 1 showing the mouth and throat mold in operative position; Fig. 15, a fragmentary vertical section, as at the plane of the line E E in Fig. 13, being near the plane of the line D D in Fig. 1, showing the mouth and throat mold retracted and in position for blowing the neck of a bottle; Fig. 16, a fragmentary vertical section on the line A A in Fig. 1; Fig. 17, a fragmentary vertical section on the line F F in Fig. 1; Fig. 18, a fragmentary section on the plane of the line G G in Fig. 17; Fig. 19, a front view of the improved neck mold and guide for the mouth and throat mold; Fig. 20, a horizontal section on the line H H in Fig. 19; Fig. 21, a vertical section on the line I I in Fig. 19; Fig. 22, a fragmentary vertical section approximately on the line J J in Fig. 1; Fig. 23, a fragmentary horizontal section on the line K K in Fig. 10; Fig. 24, a perspective view of the mouth and throat mold as preferably constructed; Fig. 25, a perspective view of a fluid pressure controlling device that coöperates with the parison-mold-table for admitting compressed air in the operations of blowing the bottle necks; Fig. 26, a fragmentary vertical section of Fig. 23 showing the construction of the blow pipes; Fig. 27, a fragmentary plan view of the parison-mold-table; Fig. 28, an inverted plan of the bottom of the improved parison-mold; Fig. 29, a fragmentary front view of the parison-mold-table; Fig. 30, a fragmentary top plan of the bench and track rails of modified construction for opening and closing the finishing-molds during rotation of the finishing-mold-table; Fig. 31, a fragmentary vertical section as on the plane of the line A A in Fig. 1; Fig. 32, a fragmentary top plan of the parison-mold-table and parts mounted thereon; Fig. 33, a perspective view of a combined guide and hanger for supporting the parisons temporarily between the parts of the finishing molds when open; Fig. 34, a fragmentary section of the air cylinder which operates the blowing apparatus, as on the plane of the line L L in Fig. 11; Fig. 35, a fragmentary plan of the main operating shaft and the treadle for controlling the principal operations of the machine; and Fig. 36, a fragmentary vertical section of the parison mold as on the line J J in Fig. 1.

Similar reference characters indicate corresponding elements or features of construction throughout the different figures of the drawings and referred to herein.

In practically carrying out the objects of the invention a suitable bench is provided which comprises a top or plate 1 of suitable form, and legs 2, 2', 3, 3', secured to the top and mounted on axles 4, 4', which have wheels 5, 5', 6, 6', thereon in order that the machine may be quickly removed from its operating position if repairs thereto are required, to be replaced without delay by another machine in good working order. The top 1 has two circular apertures 7, 7', therein and two annular bearing-plates 8 and 8' are secured on the top and extend around the apertures, each bearing plate having a V-shaped ball-race or channel 9 in the upper side thereof in which are bearing balls 10 that support upper bearing plates 11, 11', having each a V-shaped ball-race or channel in the under side thereof receiving the uppermost portions of the balls, two mold-tables 12 and 13 being secured to the upper sides of the bearing-plates 11 and 11', respectively, the ball bearings permitting the mold-tables to be turned easily by hand, but it will be obvious that the mold-tables may be variously supported rotatably on the bench top. Two annular guards 14 and 14' are secured to the top 1 at the inner sides of the annular bearing plates to prevent accidental displacement of the mold-tables when moving the machine or at other times. The mold-table 12 supports a plurality of parison-molds and the mold-table 13 supports a plurality of finishing-molds of blow-molds. The tables are arranged adjacently one to the other, and being adapted to be rotated it is designed that they work in harmony so that practically a complete bottle is produced with each operation of the blowing apparatus, and as rapidly as one mold may be moved away and another mold brought to the blowing apparatus. The parison-molds are all alike but for descriptive purposes are differently indicated, each mold comprising two principal mold-parts 15 and 15', 15$^a$ and 15$^b$, 15$^c$ and 15$^d$, and 15$^e$ and 15$^f$, respectively. The finishing molds also are all alike, but for descriptive purposes are indicated differently, each mold comprising two principal mold-parts 16 and 16', 16$^a$ and 16$^b$, 16$^c$ and 16$^d$, and 16$^e$ and 16$^f$, respectively. The mold-table 12 has four identical pillars 17, 17', 17'', 17''', secured on the top thereof equidistantly apart and at a suitable distance from its axis. The mold-table 13 has also four identical pillars 18, 18', 18'', 18''', secured on the top thereof. Each pillar has a base extension 19 and a projection 19' on the upper portion thereof extending above the base extension, and they are provided with a hinge-pin 20. The two parts of each mold have hinge-ears 21 and 21' and 22 and 22' respectively that are connected to a hinge-pin and thereby to one of the pillars, the arrangement being such that the swinging ends of the mold-parts are adjacent to the periphery of the mold-table, there being four parison-molds and four finishing-molds illustrated, and when the mold-tables are at rest the molds are positioned arbitrarily with respect to apparatus mounted on the bench so that the molds have different stations to which they are brought in operation. It is designed that the operator shall work at the front side 1$^a$ of the machine and for the purposes of illustration the approximate station positions are indicated as 1$^b$, 1$^c$, 1$^d$, 1$^e$, for the parison-molds and 1$^f$, 1$^g$, 1$^h$, and 1$^i$, for the finishing-molds. It is designed that the operator move the tables by hand a distance of one-fourth of a revolution at each operation. Each pillar has a horizontal guideway 23 therein. A stand 24 or 24' is mounted securely on the top of each mold-table at the axis thereof and has two guideways 25 and 25' therein intersecting at right angles and arranged in alinement with the guideways 23 for supporting and guiding yokes whereby to open and close the mold-parts, the yokes for the parison-molds comprising guide-bars 26, 26', 26'', 26''', mounted slidingly in the guideways and the yokes for the finishing-molds comprising similar guide-bars 27, 27', 27'', 27''', similarly mounted in the guideways therefor. Each guide-bar has a cross-head 28 thereon to which two connecting-rods 29 and 29' are pivotally connected, the connecting rods being connected to pivots 15'' with which the mold-parts are provided. When the yokes are moved toward the pillars it is evident that the mold-parts are brought together and upon opposite movement of the molds are opened. Each pair of mold-parts have lugs 30 and 30' on the free ends thereof for locking the mold-parts together. Each cross-head 28 has a wrist-pin 31 thereon and below each cross-head when in mid-position a stand 32 having a pivot-pin 32' is mounted on each mold-table, there being four stands on each mold-table. Four levers 33 for operating the parison-molds are mounted between their ends on the pivots 32' and four similar levers 33$^a$ for operating the finishing molds are mounted on the pivots 32' that are carried by the finishing-mold-table, the upper end of each mold operating lever having a slot 33' therein engaging the wrist-pin 31 or a roller 31' with which the wrist-pins are preferably provided. The lower end of each operating lever has a slightly rounded head 34 thereon either fixed or rotative, as may be desired. The operating levers may be variously actuated and controlled, and suitable means adapted for the purpose will be hereinafter described.

The mold-table 12 has four sockets 35, 35', 35'', 35''', and the mold-table 13 has four similar sockets 36, 36', 36'', 36''', to receive lock-bolts, the sockets in each mold-table being equi-distant apart near the peripheries thereof, and each mold-table has a recess 37 in the under side thereof adjacent to each socket. The lock-bolts 38, 38', are mounted in suitable positions in the bench top 1, so that each may enter a socket of the mold-table when brought to register therewith. The lock-bolts have rollers 39, and 39' mounted thereon respectively, that are adapted to roll against the under side of the mold-tables and also to enter the recesses 37 when the lock sockets are brought opposite the ends of the lock-bolts, the lock-bolts being held out of contact with the mold tables while the latter are being turned. The lock-bolts are provided with springs 40 and 40' for automatically projecting them into the sockets, and they are provided also with operating rods 41 and 41' respectively. Frame members 42 and 42' are mounted on the bench and support a rock shaft 43 which has two arms 44 and 44' thereon that are connected to the operating-rods 41 and 41' respectively, and a treadle 45 is mounted rigidly on the rock-shaft and extends forward to the front side of the machine, a spring 46 being connected to the treadle and also to the top 1 for normally holding the treadle upward. The mold-tables are preferably provided with axial shafts 47 and 47' respectively to which are secured sprocket-wheels 48 and 48', respectively, that are connected by a sprocket-chain 49 so that both of the mold-tables must rotate in unison, but in some cases the operating connections may be omitted so that the mold-tables may be turned independently.

The two principal parts of each parison-mold have identical recesses 50 and 50' therein and grooves 51 and 51' in the recesses, and also relatively smaller recesses 52 and 52' at the end of the larger recess, the mold when closed, thus having a counter-bore in its lower end in the wall of which is a groove, there being neck forming grooves 53 and 53' extending upward from the smaller recesses and larger grooves 54 and 54' extending from the neck forming grooves to the upper ends of the mold-parts for molding the parisons or blanks. Four cylindrical blocks 55 are mounted upon the parison-mold-table, each block arranged so as to be embraced in the counter-bore of a mold, and each block has screw-holes 56 and 56' therein which receive retaining screws 57 and 57' inserted from the under side of the mold-table through suitable holes, the arrangement being such that the bolts may move slightly in the holes to permit of slight movement of the blocks when embraced by the mold-parts, so that the mold-parts may fit closely against the blocks. Four finishing-mold-bottoms 58 are similarly mounted upon the mold-table 13, and each retained by means of a bolt 59 extending loosely through a hole 60 in the mold-table, there being one bottom for each finishing-mold and the lower portion of each finishing-mold has the V-shaped groove 51 preferably in a counter-bore 50. Each mold-bottom has preferably the raised central portion 61 thereon. Each block 55 and also each mold-bottom has an external V-shaped rib 62 thereon that is adapted to fit in the V-shaped grooves when the mold-parts are closed to insure accuracy in the adjustment of the two mold-parts, but it is obvious that this may be otherwise accomplished when desired in case the mold-parts are not fitted exactly on their hinge-pins. The finishing-mold-parts have recesses or grooves 63 and 63' in the lower portions thereof extending upward from the mold bottoms, and upwardly extending narrower groove portions 64 and 64' for shaping the bodies and necks of the bottles externally, the upper ends of the mold-parts having recesses 65 and 65' therein which when the mold-parts are closed constitute an annular recess that is greater in diameter than the external diameter of the bottle-neck to be formed in the mold. Each block 55 which constitutes the bottom of the parison-mold has a central bore 66 therein that serves as a throat-mold guide, the under side of the block preferably having a counter-bore 66'.

A suitable number of neck-molds are provided so that there may be one for each parison-mold and one for each finishing-mold, and preferably one or more to spare, each neck mold comprising two parts 67 and 67' connected together by means of a hinge-pin 68 at one side, the opposite side of the parts having recesses 69 and 69' therein respectively in one of which is a hinge-pin 70 and in the other of which is a lug 70', a handle 71 being mounted on the hinge-pin 70 and having a finger 72 thereon adapted to be moved into engagement with the lug for securing the two parts of the mold together when closed, the parts 67' being provided with a handle 71' adjacent to the recess 69' therein so that the handles together may be used for carrying the mold. The neck-molds are adapted to rest upon the blocks 55 and to be embraced by the hinged parison-mold-parts in the larger counter bore therein, the hinged-mold-parts having recesses 73 and 73' through which the handles of the neck-mold extend and project beyond the hinged mold-parts. One side of the neck-mold-parts have projections 74 and 74' thereon adapted to fit into the recesses 52 and 52' and also into the recesses 65 and 65' when the neck-molds are inverted and placed upon the tops of the finishing-molds, for guiding the neck-molds while the finishing-molds are being closed upon the parison. The neck-mold-parts 67 and 67' have grooves 75 and 75' therein which when the mold is closed constitute a guideway for the throat-mold shaft, there being recesses 76 and 76' in the parts of suitable contour to shape the exterior of the upper portion of the bottle-neck and also grooves 77 and 77' to form beads on the upper end of the neck of the bottle, and it will be understood, that the neck-molds may be designed to form various contours as may be desired, the neck-molds shown being designed for forming narrow neck bottles to hold crown stoppers. The neck-mold-parts have external grooves 78 and 78' therein for supporting the neck-molds in the opened finishing-molds, each pillar 18 and the like on the mold-table 13 having a plate 79 mounted on the top thereof provided with two fingers 80 and 80' for guiding and supporting the neck-molds temporarily, the grooves in the exterior of the neck-molds receiving the fingers of the supporting plates.

The mold-table 12 has a suitable number of vertical guideways 81 therein, each preferably having a counter-bore 81' and a spline-way 82 in the side of the guideway, the guideways being below and in register with the guideways 66 of the blocks 55. A suitable number of mouth and throat-molds constituting shaping and finishing patterns are provided, each comprising a shaft 83 guided in the guideway 66, and a shank-part 83' guided in the guideway 81, there being a mouth-and-throat-mold for each parison-mold, each shank-part having a spline 84 thereon extending into the spline-way and a collar 85 operative in the counter-bores 66' and 81'. Each shank-part 83' is provided with a guide-pin 86 which preferably has rollers 87 and 87' thereon, and the end of the shaft 83 has a somewhat tapering throat-mold 88 thereon at the base of which is a filleted portion constituting a mouth-mold 88', and preferably an air duct 89 is provided which extends through the shaft 83 into the shank-part 83' in the side of which is a valve-port 89' communicating with the duct. The bench-top 1 has a track 90 on a portion thereof that has an inclined approach end 90' and an inclined terminal end 90" which is at the station 1ᵉ, the track extending between said station and the station 1ᵈ and somewhat beyond the latter, for raising the mouth-and-throat-molds to operative position and permitting them to descend after the operation of molding a neck.

Two retracting rails 91 and 91' preferably are mounted on the bench-top above the plane of the inclined end 90' to be engaged by the rollers 87, 87', for retracting the mouth-and-throat-molds in case they do not move freely in the guideways. The table 12 has a suitable number of air-ducts 92 therein, one for each parison-mold and extending from the periphery of the mold-table into each guideway 81, the periphery of the mold-table being turned true and smooth and preferably having narrow horizontally extending recesses 92, therein at the outer ends of the air-ducts 92. A valve member 93 having a standard 93' is thereby secured on the bench-top 1 near the station 1e and is fitted closely to the peripheral face of the mold-table, and it is of sufficient length to cover and extend beyond opposite ends of each recess 92', the valve-part having a suitable port 94 therein which extends through a nipple 94" to admit compressed air which may pass through the ducts 92 when the table is turned to the required position to bring a duct or the recess 92' behind the valve-member 93. The arrangement is such that after the mouth-and-throat-mold is lowered from normal position on movement of the mold-table the port 89' is brought into register with the port 92, so that compressed air may pass through the air-duct 89. Compressed air may be supplied by various means to the nipple 94", as will be obvious, but it is preferred to do so by means of an inter-connecting air-supply system, as will further appear.

A pair of relatively tall pillars 95 and 95' are mounted rigidly upon the bench top 1 in proximity to the working stations 1e and 1k and preferably are cast on a common base 95". The upper portions of the pillars have projecting wings 96 and 96', and 96" and 96"', respectively, thereon. A suitable cross-head is provided comprising a cross-bar 97 and two guide-bars 98 and 98', the latter being guided so as to move vertically in the wings of the pillars, and they guide the cross-bar above the pillars. An operating rod 99 is secured to the cross-bar 97 and it constitutes a piston-rod that extends movably into a common type of cylinder 100 and has a piston 99' thereon to be actuated by compressed air suitably admitted into the cylinder. It will be apparent, however, that the operating rod 99 may be otherwise operated and controlled if so desired. The pillars 95 and 95', as will be seen are opposite the molds at the stations 1e and 1k, so that the lugs 30 and 30' of the molds are in proximity to the pillars, and each pillar has a pivot 101 thereon conveniently near the lugs of the molds. Two clamp-jaws 102 and 102' are mounted on one pivot and similar jaws on the other pivot, and they have adjusting screws 103 and 103" therein and are provided with operating arms 104 and 104' normally drawn together by a spring 105 connected thereto, and when the arms are drawn together the jaws are swung apart and upwardly sufficiently to permit the lugs to pass under the jaws. In order to cause the jaws to clamp the lugs together two operating-bars 106 and 106' are suitably guided so as to move vertically on the pillars 95 and 95' and are secured to the cross-bar 97, each operating-bar having two rollers 107 and 107' thereon that are in contact with the opposing inner sides of the curved arms of the jaws, and when the operating bars are moved downward it is evident that the clamp-jaws are forced together, so as to securely lock the two parts of a mold together, the locking operations occurring when the cross-head is moved downward and unlocking of the mold-parts being effected when the cross-head moves upward in performing other functions, so that the locking and unlocking operations are accomplished without requiring independent action of the operator. The cross-bar 97 has two valve-chests 108 and 108' thereon through which two blow-pipes 109 and 109' extend, respectively, the blow-pipes extending downward through the wings of the pillars 95 and 95' in which they are guided, the blow-pipes terminating somewhat above the planes of the molds. Each blow-pipe is suitably guided to prevent rotation thereof as by means of pins 110 secured thereto and extending into slots 111 in the walls of the valve-chest, or otherwise as may be desired. Each blow-pipe has a collar 112 thereon to be engaged by the top of the valve-chest for lifting the blow-pipe, and also each blow-pipe has another collar 113 thereon below the valve-chest, a spring 114 being arranged on each blow-pipe and seated against the under side of the valve-chest and also on the collar 113. The lower ends of the blow-pipes 109 and 109' are provided with head-plates 115 and 115', respectively, having each a central aperture 116 therein, the upper ends of the blow-pipes being closed. The aperture in the head-plate 115 is slightly smaller in diameter than the interior of the blow-pipe and a stem 117 extends therethrough and has a stop-pin 118 in its upper portion that normally rests on the upper side of the head-plate, the lower end of the stem having a flat head 119 thereon, for compacting the upper ends of the parisons. Each valve-chest has a chamber 120 therein in which is mounted a valve 121 which is in contact with the exterior of the blow-pipe, and it has a port 122 therein, the adjacent blow-pipe having a port 123 therein which is in register with the port 122 when the valve-chest is moved downward on the blow-pipe the required distance to admit compressed air from the chamber into the blow-pipe, the ports being closed when the valve-chest is lifting and supporting the blow-pipe. Preferably a spring 124 is arranged in the chamber 120 for holding the valve against the blow-pipe, although this is accomplished ordinarily by the air-pressure in the chamber. It will be understood, of course, that leakage of air around the valve 121 may be variously guarded against by the skilled mechanic in construction. The head-plate 115 in operation is moved down upon each parison-mold in turn and covers the opening in the mold, the compacting-head 119 entering the mold, and the head-plate 115' is moved down upon the neck-molds that are placed upon the finishing-molds. In order to supply the blow-pipes with compressed air a stand-pipe 125 is mounted upon the base 95'' and extends upward beyond the plane of the tops of the pillars 95 and 95', and is provided with two stop-cocks 126 and 126' by which the flow of air may be regulated, and to which are connected flexible conduits 127 and 127' which are connected to the valve-chests 108 and 108', respectively, to admit the compressed-air into the chambers 120. The lower end of the stand-pipe has a supply-pipe 128 connected thereto which is supported under the bench-top 1 and has a riser 129 that extends downward and is connected to a horizontal pipe 130 provided with a union 131 whereby it is connected to a stop-valve 132 which is in connection with a line-pipe 133, which it will be understood may be supplied with compressed-air by various means. It will be understood also, that the piping may be variously arranged as may be most convenient.

In order to most conveniently supply the valve-member 93 with compressed air a branch-pipe 124 is connected therewith and also with the stand-pipe 125. It is evident that if it is not desired to force air through the mouth and throat-mold the air may be variously prevented from being conducted thereto.

In order to control the admission and exhaust of the fluid pressure in the cylinder 100, a suitable controlling-valve is employed which may be variously constructed and may be one of a common type of rotary-valve comprising a valve-chest 135 supplied with compressed-air through a branch-pipe 136 connected thereto and to the pipe 128, a suitable-valve being arranged in the valve-chest. The valve, of course, controls the admission of air into suitable ports with which are connected ducts 137 and 138 which are connected to opposite ends of the cylinder 100, and the valve has an operating arm 139 thereon to which is connected an operating-rod 140 which is connected to an arm 141 rigid on the rock-shaft 43, so that the valve is operated when the treadle 45 is moved. Valves of this character being well known to mechanics and being of obvious construction require no further description.

It is preferred to expedite the operations of swinging the mold-parts on their hinges automatically when other operations are occurring, and to this end two cylinders 142 and 143 of ordinary type are supported on the under side of the bench-top 1 with their axes at right angles one to the other, and it is preferred that the fluid pressure for both cylinders be controlled by one valve arranged in a valve-chest 144 supplied with compressed air through a branch-pipe 145 connected thereto and also to the pipe 128, the cylinders being connected at one end with the valve-chest by means of conduits 146 and 146' and at opposite ends by means of a conduit 147 having branches 148 and 148', so that the pistons in the cylinders shall advance and return in unison. The controlling-valve in the valve-chest 144 of course, has an operating arm 149 to which is connected an operating-rod 150 which is connected to the treadle 45, and consequently the air for the cylinders is controlled through the medium of the treadle.

A piston-rod 151 emerges from the cylinder 142 and has two upwardly extending fingers 152 and 153 thereon spaced apart a suitable distance, and the outer end of the piston is suitably guided on a guide-bar 154 secured to the bench-top 1 and arranged so as to intersect the axis of the mold-table 12, there being a piston, of course, on the inner end of the piston-rod to be actuated by the fluid-pressure in the cylinder. The piston is normally projected, as in Fig. 1, and elsewhere, so that when the mold-table 12 is rotated the mold-operating-levers 33 are in succession moved between the fingers 152 and 153, to be operated by retracting and then projecting the piston, and then moved away from the fingers, the levers preferably being guided from the fingers through their cycle back to the fingers by a guide-rail 155 mounted on the guide-bar 154, and another guide-bar 154' secured also to the bench-top 1, although in some cases the guide-rail may be dispensed with if desired. By reference, to Fig. 2 it will be seen that the piston-rod 151 operates in the vertical plane intersecting the operating station 1ᵇ and the axis of the mold-table 12, so that each parison-mold is opened and closed only when in position at the operating station above-mentioned. A piston-rod 156 extends from the cylinder 143 and has a piston 156' therein within the cylinder, the piston-rod, as will be seen, being at right angles to the piston-rod 151 and in a vertical plane intersecting the operating station 1ᶠ and the axis of the mold-table 13. The piston-rod 156 has a finger-bar 157 thereon on which preferably is a rigid upwardly extending finger 158 and is guided suitably on a guide-bar 159 secured to the bench-top 1 to which is secured also a cross-bar 159'. An arm 160 has one end thereof mounted on a pivot 161 with which the finger-bar 157 is provided, the opposite end of the arm being arranged to be moved in the slot 157' in the finger-bar. The arm 160 has a finger 162 thereon that is normally held opposite the finger 158 by means of a spring 163 mounted on the finger-bar 157 which forces the arm 160 upward until stopped by a projection 164 thereon rearward of the pivot 161, the projection being adapted to engage the top of the finger-bar 157. The piston 156 normally is projected as will be understood, and the operating levers 33ª are moved outward from the axis of the mold-table 13 to open the finishing-molds by means of a guide-rail 165 mounted on the bars 159 and 159', so that when the mold-table is further rotated the levers 33ª are carried over the arm 160 while the fingers are not in position and, of course, are not needed since the mold does not then require opening, but in order to close the mold at the same time a parison-mold is closed the fingers 158 and 162 are moved outward until the back of the finger 162, which is inclined, comes in contact with the lower end of the operating lever 33ª and is thereby forced downward and passes under the lever and then springs up behind the lever, so as to be in position for moving the lever to close the mold at the same time that the parison-mold is closed. Fig. 3 shows the finger 162 as when passing under the operating lever, and in Fig. 16 the finger 162 is in position for pushing the operating lever toward the axis of the mold-table. It will be seen by reference to Fig. 2 that the guide-rail 165 is adapted to be engaged by the operating-lever when the molds leave the station 1ʰ, and as the lever extends tangentially to the circle described by the end of the lever on approaching the guide-rail, and the guide-rail terminates farther from the axis of the mold-table, it is evident that the lever is forced to move away from the axis and opens the mold when the latter arrives at the station 1ⁱ, and then the molds are moved thence to the station 1ᶠ in open arrangement.

It being designed to place the metal of which to form the parisons in the parison-molds when they are at the station 1ᵈ, a post 166 is secured upon the bench-top 1 near said station, and it has a pivot 167 thereon on which are mounted two coöperating clipper-blades 168 and 169 having operating handles 168' and 169', respectively, to which a spring 170 is connected for normally holding the clipper-blades apart, the ends of the blades being curved each toward the other and permitting the metal for the parison to be inserted between the blades when placing it in the mold, the blades being arranged a suitable distance above the plane of the top of the mold, so that all the parison-molds may be moved in succession under the parison-clipper. A shaft 171 is mounted on the post and extends through the top 1 of the bench, and it has a cam 172 on its upper end arranged between the handles of the clipper-blades, for forcing the handles apart on rotation of the shaft in order to clip the metal. The lower end of the shaft 171 has a pinion 173 secured thereto. A cylinder 174 is mounted on the under side of the bench-top 1 and has a piston-rod 175 provided with a piston 175', operating therein. The piston-rod has a rack-bar 176 on its outer end which is arranged movably in a guide-bar 176' and is in contact with the pinion 173. The cylinder is similar to those hereinbefore described, and a controlling-valve of the character above described comprises a valve-chest 177, which is connected by conduits 178 and 178' with the valve-chest and by a branch-pipe 179 with the air supply-pipe or riser 129, the controlling valve having an operating arm 180 to which an operating-rod 181 is connected which extends downward and is connected to a treadle 182 which is mounted on the axle 4, there being a spring 183 connected to the treadle and also to the top 1 for normally drawing the treadle upward.

In some cases it may be desirable to use the compressed air most economically and it is permissible to dispense with the cylinder 143 and the apparatus connected therewith and open and close the finishing-molds by other means, in which case a guide-rail 184 may be connected with the terminal of the guide-rail 165 to guide the levers 33ª while the molds move from the station 1ⁱ to the station 1ᶠ, being a precautionary measure to prevent accidental movement of the operating levers, but may in some cases be unnecessary, but a guide-rail 185 is supported on the bars 159 and 159' and opposes the lower ends of the operating levers 33ª when the molds move from the station 1ᶠ to the station 1ᵏ and force the levers inward toward the axis of the mold-table 13, therefore closing the finishing-molds on arrival at the station at which the bottles are blown, the molds remaining closed until they pass the station 1ʰ, as hereinbefore described, when they are opened during passage from the station 1ʰ to the station 1ⁱ by means of the guide-rail 165.

It will be understood that the controlling valves for the air cylinders have their air-ports so arranged that the several piston-rods shall operate as follows: The mold-tables being locked in normal position, the treadle 45 is in its normal upward position.

When the treadle is depressed the lock-bolts 38 and 38' are drawn downward until the rollers 39 and 39' are stopped by contact with the top 1 of the bench and at the same time the operating-rod 140 is pushed upward and moves the arm 139 so that the valve in the valve-chest 135 admits the air into the lower end of the cylinder 100, the air forcing the rod 99 upward and it lifts the head-plates 115 and 115' from the molds, the movement causing the air to be shut off from the blow-pipes and then the mold-tables may be turned. Since the descending treadle also pulls down the operating-rod 150 the movement of the arm 149 causes the valve in the valve-chest 144 to admit air through the pipes 148 and 148' to project the piston-rods and close the molds, which, of course, must be effected before the attendant begins to rotate the mold-tables. After starting to rotate the mold-tables the attendant removes his foot from the treadle 45 and thus permits the lock-bars 38 and 38' to rise until the rollers 39 and 39' come in contact with the under sides of the mold-tables, but this movement does not cut off the air supply previously admitted to the three cylinders 100, 142 and 143. When the mold-tables have been turned until the lock-bolts enter the sockets 35 and 36 the rods 140 and 150, of course, move farther and further move the controlling valves which permit the air previously admitted to the cylinders to be exhausted and admit air into the opposite ends of the cylinders, with the result that the pistons are moved in the opposite direction in the cylinders 142 and 143 and open the mold that has stopped at the station 1ᵇ, and both pistons are ready to again be advanced to close both the parison-mold and the finishing-mold. While the aforesaid parison-mold is being opened the action of the air in the cylinder 100 draws the cross-bar 97 downward, with the result that the blowing operations take place in the molds at the stations 1ᵉ and 1ᶠ. It will thus be seen that one operator while controlling the blowing operations with one foot by means of the treadle 45 has his hands free to attend to transferring the parisons from the parison-molds to the finishing-molds.

It will be evident from the foregoing that the facilities for increasing the output of the single machine may be multiplied by providing additional molds on the mold-tables without increasing the number of blow-pipes, so that in some cases one operator may be enabled to control the operations more rapidly while permitting the desired interval between the filling and blowing of the molds. Also it is clear that various modifications may fairly be made within the scope of the appended claims, such as the omission of the gearing between the mold-tables, since the operator's assistant may rotate the mold-table 13 in harmony with the movement of the mold-table 12.

In the operation of the machine and carrying out the method of treating the molten glass, besides the operator at the front 1ᵃ, a mold-filler stands near the treadle 182 and an assistant stands near the final station 1ⁱ, the three persons only being required in producing bottles as rapidly as one blow-pipe can blow them one after another in succession with the required intervals in moving the molds to and from the blow-pipes. The mold-filler dips a rod into a furnace-pot as usual and carries the required quantity of semi-fluid metal over the mold which is stopped at the station 1ᵈ and lowers the metal into the closed parison-mold in which a neck-mold has been previously placed, and he then operates the treadle 182 which causes the parison-clipper to be operated rapidly so that it clips off the metal and leaves a crude parison 186 in the parison-mold, and then upon rotation of the mold-table the mold is moved under the blow-pipe 109, and during its movement the metal has time to settle solidly in the parison-mold. When the molds are brought to rest the next parison-mold is charged also with metal to form a crude parison, and so on in succession. The mold that is stopped under the blow-pipe 109 is automatically locked tightly as hereinbefore explained, and the parison completed by reason of the compressed air forcing the compacting head 119 upon the top of the parison and flattening it, some of the air passing by the head directly to the marginal portions of the end of the parison. During the lowering of the blow-pipe 109 the compacting head 119, being suspended, comes in contact with the end of the parison and tends to flatten it somewhat before the head-plate 115 comes in contact with the top of the parison-mold. While the parison-mold is moving toward the station 1ᵈ, as hereinbefore explained, the mouth-and-throat-mold is raised to operative position by the track 90 and so held while the metal is forced upon and around the mold 88 proper and into the neck-mold. After the blow-pipe is elevated and the mold-table begins to move, the mouth-and-throat-mold moves downward clear of the mouth and throat formed thereby, and immediately the port recess 92' is brought opposite the port 94 so that compressed air passes through and out of the duct 89 into contact with the walls of the mouth and throat, and compacts the metal and also forces the metal centrally upward and thus extends the throat, as shown in Fig. 15, a perfected parison 187 being then formed. The mold-tables continue to rotate until the mold containing the perfected parison reaches the station 1ᵇ when the mold-table becomes locked and the mold is then opened either upon movement of the treadle 45, as above described, or by action of any other devices. After the mold is opened the operator by means of the handles of the neck-mold lifts the neck-mold and the parison therewith from the block 55 and inverts them and then hangs the neck-mold on the fingers 80 and 80' temporarily, while he inserts another neck-mold in the now open parison-mold, after which both the parison-mold and the finishing-mold are caused to be closed, and then the mold-tables are unlocked and rotated until the parison-mold is moved and stopped at the station 1ᵉ and permitted to become partially cooled, the finishing-mold just filled being moved from the station 1ᶠ with the parison therein to the station 1ᵃ, and the mold-table having become locked the blow-pipe 109' is lowered simultaneously with the blow-pipe 109, so that while the parison in one mold is being blown and perfected the parison in the mold at the station 1ᵍ is at the same time being blown and finished in the finishing-mold, and is then moved to the station 1ʰ and permitted to rest and solidify while another bottle is being blown, the mold at the station 1ᵇ being then advanced to the terminal station 1ⁱ and opened in its passage thereto, and then the attendant removes the finished bottle 188 and after placing it in the cooling rack or elsewhere hands the empty neck-mold to the operator, the empty finishing-mold being left open and moved on to the station 1ᶠ is partially cooled on its arrival there.

It will be understood that while the bottles are being blown in the finishing-mold the flattened bottoms of the parisons are first forced against the mold bottoms 58 and firmly seated on the raised portion 61, so that as the glass is blown out against the wall of the finishing-mold the glass is prevented by the flattened bottom from being blown unevenly in any one direction outwardly, since the metal on the mold bottom is not disposed to slide more in one place than another, the result of first flattening the end of the parison being that the bottom of the bottle is practically uniform in contour and free from flaws and blemishes, as is also the wall of the bottle adjacent to the bottom. It will be noted further that the mouth-and-throat-mold 88, being more or less tapering is freely drawn away from the metal which is left in smooth condition and true in contour, and then the action of the air blast compacts the wall of the throat while pushing the surface metal upward and extending the throat, and thus roughened surfaces and blemishes or irregularities in the throat of the bottle are prevented. In some cases, however, it may not be desired to immediately extend the throat by the use of the air pressure while completing the parison, and in such cases the mouth and throat-mold may be suitably modified by omitting the air ducts therein.

It will be seen that since the parison clipper is arranged at a measured distance above the top of the parison-mold the mold filler soon becomes highly proficient and is enabled to clip off the parison at the proper moment, so that the parisons are all substantially of uniform volume or size, thus enabling the machine to turn out bottles of practically uniform weight, with the result that not only metal is saved, but a saving in transportation charges of the bottles is effected since surplusage of glass in the bottles is eliminated.

The functions of elements not minutely described and the results of operation which may not have been specifically pointed out it is believed are apparent from the foregoing description, in view of the present state of development of the methods and apparatus for producing glass-ware.

Having thus described the invention, what is claimed as new, is—

1. In a glass working machine the combination of a rotary mold-carrying table, a body mold mounted thereon and comprising mating members movable relative to each other, a neck forming plunger movably mounted in the table and provided with an air duct and port, an air passage formed in the body of the table and having one end arranged for registry with the port of the plunger air passage, and means for supplying air to the air passage in the table.

2. Bottle-producing apparatus including a mold-table having a vertical guideway therein and also an air-port extending to the guideway, a mold-bottom on the mold-table and having a vertical guideway therein registering with the other guideway, a pillar rigid on the mold-table adjacent the mold-bottom, a neck-mold removably supported on the mold-bottom, two parison-mold-parts hinged to the pillar and movable to or from the mold-bottom and the neck-mold, and a mouth-and-throat-mold movable vertically in the guideways and into or out of the neck-mold, the mouth-and-throat-mold having a passageway therein for conducting air from the air-port into the neck-mold when the mouth-and-throat-mold descends.

3. Bottle-producing apparatus including a mold-table having a vertical guideway therein and an air-port extending to the guideway, the guideway having a vertical groove in its side, a mold-bottom on the mold-table and having a guideway therein registering with the guideway in the mold-table, a neck-mold removably supported on the mold-bottom, two parison-mold-parts removably supported in contact with the mold-bottom and the neck-mold, a mouth-and-throat-mold movable vertically in the guideways and into the neck-mold, the upper portion of the mouth-and-throat-mold having an upwardly facing filleted shoulder and the lower portion having a rib thereon extending into the groove, the mouth-and-throat-mold having also an air-duct therein to conduct fluid-pressure from the air-port into the neck-mold.

4. Bottle-producing apparatus including a mold-table, a pillar secured fixedly upon the mold-table, a mold-bottom on the mold-table, two mold-parts hinged to the pillar and movable to or from the mold-bottom, a plate secured upon the pillar and having two horizontal fingers thereon extending above the plane of the tops of the mold-parts, and a neck-mold having two horizontal grooves in opposite sides thereof to receive the fingers and be supported thereby when the mold-parts are moved from the mold-bottom.

5. Bottle-producing apparatus including a bench, a valve member supported on the bench and having an air-port therein, a mold-table rotative on the bench in sliding contact with the valve member and having a guideway therein and also an air-port extending from the guideway to the portion that has sliding contact with the valve member, the rotating mold-table bringing the air-port therein opposite the port in the valve-member, a neck-mold mounted on the mold-table, and a mouth-and-throat-mold movable in the guideway to coöperate with the neck-mold and having an air-duct therein and carried thereby opposite the air-port in the mold-table.

6. Bottle-producing apparatus including an upright mold, a valve-chest supported above the mold and movable vertically, a valve in the valve-chest and having a port therein, a blow-pipe movable vertically in the valve-chest in contact with the valve and having a port therein opposite the valve, the blow-pipe being above the mold and having a collar fixed thereon below the valve-chest, a spring seated against the collar and the valve-chest, and a collar fixed on the blow-pipe above the valve-chest and supporting the blow-pipe on the valve-chest with the port in the blow-pipe lower than the port in the valve, and means for moving the valve-chest downward to lower the blow-pipe onto the mold and compress the spring to bring the port in the valve to the other port.

7. Bottle-producing apparatus including a bench, a mold-table rotatably mounted upon the bench, a plurality of pillars secured upon the mold-table and having guideways therein, a stand secured upon the mold-table and having guideways therein in alinement with the guideways in the pillars, guide-bars movable in the guideways and having cross-bars fixed thereon, a plurality of pairs of mold-parts hinged to the pillars, a pair to each, a plurality of pairs of connecting-rods pivoted to the mold-parts and also to the cross-bars, there being a connecting-rod for each mold-part and a pair to each cross-bar, and a plurality of operating-levers pivoted between their ends to the mold-table between the pillars and the stand, each operating-lever being connected to a cross-bar.

8. Bottle-producing apparatus including a bench, a mold-table rotative on the bench, a pillar secured upon the mold-table, a pair of mold-parts hinged to the pillar and having each a lug thereon, means for bringing the mold-parts together, a relatively tall pillar secured upon the bench and having a pivot thereon, a pair of clamp-jaws mounted on the pivot and having diverging arms, a spring for normally holding the clamp-jaws apart and above the plane of movement of the lugs carried on rotation of the mold-table, an operating bar mounted on the tall pillar and movable against the inner sides of the arms to force the clamp-jaws against the lugs for locking the mold-parts together, and a blow-pipe mounted in juxtaposition to the tall pillar and movable to the mold-parts when the latter are locked together.

9. Bottle-producing apparatus including a bench, wheels supporting the bench, two mold-tables mounted rotatably on the bench and having each a plurality of pillars secured thereon, a plurality of pairs of parison-mold-parts hinged to the pillars of one of the mold-tables, a pair to each pillar, a plurality of pairs of finishing-mold-parts hinged to the pillars of the other one of the mold-tables, a pair to each pillar, means for operating the parison-mold-parts, means for operating the finishing-mold-parts, shears mounted upon the bench and under which the parison-mold-parts are movable, fluid-pressure means for operating the shears, two coupled blow-pipes mounted movably upon the bench at operating stations, means for locking the mold-parts at the stations, and fluid-pressure means for moving the two blow-pipes in unison to or from the mold-parts at the stations.

10. Bottle-producing apparatus including a bench-top having an opening therein, a mold-table mounted rotatably upon the bench-top above the opening, a plurality of pillars secured upon the mold-table, a plurality of pairs of mold-parts hinged to the pillars, a pair to each pillar, a plurality of crossheads mounted movably upon the mold-table and each connected operatively with a pair of mold-parts, a plurality of operating levers mounted pivotally on the mold-table and each connected to a crosshead, each lever extending through the opening in the bench-top, the lower ends of the levers being carried in a circle by the moving mold-table, an air-cylinder supported below the bench-top, a piston-rod extending from the air-cylinder and having two up-turned fingers thereon normally standing at opposite sides of the circle in which the ends of the levers are carried, and means for controlling admission of fluid-pressure in the air-cylinder to operate the piston-rod.

11. Bottle-producing apparatus including a bench, two pillars secured upon the bench, two mold-tables mounted rotatively upon the bench and having each a plurality of sectional molds mounted thereon, the molds on one of the mold-tables being parison-molds and movable thereby in succession to a working station opposite one of the pillars, the molds on the other one of the mold-tables being finishing-molds and movable thereby in succession to a working station opposite the other one of the pillars, two blow-pipes mounted to move above the working stations, one above each station, movable means for locking the sections of the molds together and unlocking them at the stations, and operating means connected with the blow-pipes and also with the movable locking means for moving the blow-pipes simultaneously to or from the respective molds at the stations, one blow-pipe to a parison-mold and the other blow-pipe to a finishing-mold, and also simultaneously operating the locking means.

12. Bottle-producing apparatus including a bench, two pillars secured upon the bench, two mold-tables mounted rotatively upon the bench and having each a plurality of molds mounted thereon, the molds on one of the mold-tables being movable thereby in succession opposite one of the pillars and the molds on the other one of the mold-tables being movable thereby in succession opposite the other one of the pillars, a stand-pipe supported on the bench in proximity to the pillars, a cross-head mounted on the two pillars and movable vertically, an operating-rod connected to the crosshead, two valve-chests on the cross-head, two flexible conduits connected with the stand-pipe and each connected also with a different one of the valve-chests, regulating valves in the conduits, two blow-pipes, each mounted in a different one of the valve-chests and movable thereby to a different one of the molds when opposite a pillar, and means for conducting fluid-pressure from the valve-chests simultaneously to both of the blow-pipes respectively.

13. Bottle-producing apparatus including a bench, a plurality of blow-pipes mounted movably on the bench, means for moving the blow-pipes toward or from the bench in unison, a plurality of mold-tables mounted rotatably upon the bench, a plurality of sectional parison-molds mounted sequentially upon one of the mold-tables, a plurality of sectional finishing-molds mounted sequentially upon the other one of the mold-tables, the parison-molds being movable in succession to and past a station under one of the blow-pipes, the finishing-molds being movable in succession to and past a station under the other one of the blow-pipes, clamping means mounted substantially on the bench at the stations for clamping the sections of the molds when at the stations and connected operatively with the means for moving the blow-pipes, an operator's controller mounted movably on the bench, locking means for the mold-tables connected with the controller, mold-section-operating means enabled to act only when the mold-tables are locked, and means for controlling the movements of the blow-pipes connected operatively with the operator's controller.

14. Bottle-producing apparatus including a bench having an opening therein, a mold-table mounted rotatively upon the bench above the opening, a pillar secured upon the mold-table, a pair of mold-parts hinged to the pillar, an operating lever pivoted on the mold-table and extending into the opening in the bench, a pair of connecting-rods pivoted to the mold-parts, a cross-head connected to the connecting-rods and also to the operating-lever, a rail supported by the bench below the opening and arranged eccentrically to the axis of the mold-table and in the path of the operating-lever to move the latter in one direction on rotating the table to open the mold-parts, an operating-rod supported movably by the top of the bench and having an upturned finger thereon that is normally held away from the path of the operating-lever when the latter has been moved by the rail, the finger being movable on the operating-rod to be pushed aside from its normal position when forced into contact with the operating-lever on retraction of the operating-rod, the finger being spring-pressed to its normal position after being pushed aside to engage the operating-lever, and means for moving the operating-rod.

15. In a bottle-blowing machine, the combination of a pillar provided on the top thereof with a supporting-plate having two fingers thereon which project horizontally beyond the pillar, with two mold parts hinged to the pillar to move together or apart under the fingers, and a neck-mold adapted to be temporarily supported by the fingers when the mold-parts are apart and to coöperate with the mold-parts when moved together.

16. In a bottle-molding machine, the combination with a bench, and a pillar supported on the bench, of a mold-table rotative on the bench and having a smooth cylindrical periphery in which is a circumferentially-extending recess, the mold-table having a vertical guideway therein and an airport extending from the recess to the guideway, a block mounted on the mold-table and having a guideway therein in alinement with the guideway in the mold-table, a neck-mold seated removably upon the block and having a guideway therein in alinement with the guideway in the block, parison-mold-parts mounted upon the mold-table and normally embracing the neck-mold, a mouth-and-throat-mold guided in the guideways and adjustable vertically in the neck-mold, the mouth-and-throat-mold having a longitudinal air-duct therein and a horizontal air-port extending from the air-duct to the side of the body of the mouth-and-throat-mold to be brought down opposite the air-port in the mold-table, means for locking and unlocking the mold-table with the mold-parts opposite the pillar, means mounted on the pillar for locking the mold-part together, means for holding the mouth-and-throat-mold up in the neck-mold when the mold-table is locked, means for moving the mouth-and-throat-mold downward from the neck-mold and bring the air-port therein opposite the air-port in the mold-table on rotation of the mold-table when unlocked, and a valve-member supported upon the bench near the pillar in contact with the periphery of the mold-table and having an air-port therein to conduct fluid-pressure to the recess in the periphery on rotation of the mold-table.

17. In a bottle-blowing machine, the combination of a bench, a valve-member supported fixedly upon the bench and having an air-port therein, and a mold-table rotative upon the bench having an air-port therein to be brought opposite the air-port in the valve-member on rotation of the mold-table, with a parison-mold mounted upon the mold-table, a neck-mold in the parison-mold, a mouth-and-throat-mold in the neck-mold, means for supporting the mouth-and-throat-mold at rest in the neck-mold, means for lowering the mouth-and-throat-mold from the neck-mold on rotation of the mold-table, and means for conducting fluid-pressure from the air-port in the mold-table into the neck-mold when the mouth-and-throat-mold is lowered.

18. In a bottle-blowing machine, the combination of a bench, two mold-tables rotative on the bench, a plurality of sectional parison-molds mounted upon one of the mold-tables, a plurality of sectional finishing-molds mounted upon the other one of the mold-tables, a blow-pipe and also mold-locking means supported movably upon the bench adjacent one of the mold-tables, a blow-pipe and also mold-locking means supported movably upon the bench adjacent the other one of the mold-tables, intermediate operating means connected with all the blow-pipes and all the mold-locking means, means for locking the mold-tables, mechanism for operating the parison-molds carried by their mold-table, means mounted on the bench for operating the mechanism and connected operatively with intermediate operating means and also with the table-locking means, mechanism for operating the finishing-molds carried by their mold-table, means mounted on the bench for operating the last-mentioned mechanism to close the finishing-molds and connected also with the intermediate operating means and also with the table-locking means, and means mounted on the bench for operating the last-mentioned mechanism to open the finishing-molds.

19. In bottle-producing apparatus, the combination with a mold-table having a vertical guideway therein and an air-duct extending to the guideway, a block on the mold-table, a neck-mold seated removably on the block and having a vertical guideway therein registering with the guideway in the mold-table, and two parison-mold-parts embracing the neck-mold, of a mouth-and-throat-mold guided movably in the guideways and normally extending into the neck-mold and adapted to coöperate therewith for shaping the lip or extremity of the bottle neck and for also shaping the mouth adjacent the lip, the mouth-and-throat-mold having therein a vertical air-duct and a port extending therefrom to the outer side of the wall thereof, and means for supporting the mouth-and-throat-mold at rest in normal position and permitting it to be lowered to bring the port opposite the air-duct in the mold-table.

20. In bottle-producing apparatus, the combination with a bench, two mold-tables mounted rotatably on the bench and having each a plurality of pillars secured thereon, a plurality of pairs of parison-mold-parts hinged to the pillars of one of the mold-tables, a pair to each pillar, and a plurality of pairs of finishing-mold-parts hinged to the pillars of the other one of the mold-tables, a pair to each pillar, of means for locking the mold-tables with the mold-parts at operating stations, two coupled blow-pipes mounted movably upon the bench at operating stations, means for locking the pairs of mold-parts together at the operating stations, and means for moving the two blow-pipes in unison to or from the mold-parts at the stations.

21. In bottle-producing apparatus, the combination with a bench, two mold-tables mounted rotatably on the bench and having each a plurality of pillars secured thereon, a plurality of pairs of parison-mold-parts hinged to the pillars of one of the mold-tables, a pair to each pillar, and a plurality of pairs of finishing-mold-parts hinged to the pillars of the other one of mold-tables, a pair to each pillar, of means for locking the mold-tables with the mold-parts at operating stations, two coupled blow-pipes mounted movably upon the bench at operating stations, movable means for locking the mold-parts together at the operating stations and operatively connected with the blow-pipes to be operated and controlled coincidently with the movement thereof, and means for moving the two blow-pipes in unison to or from the mold-parts at the stations and operatively connected with the means for locking the mold-tables.

22. In bottle-producing apparatus, the combination with a bench, and a pillar supported on the bench, of a mold-table rotative on the bench and having a plurality of vertical guideways therein equidistant apart, a plurality of annular blocks mounted on the mold-table at the guideways, a neck-mold seated removably upon one of the blocks and having a guideway therein in alinement with the guideway in the mold-table, pairs of parison-mold-parts mounted movably upon the mold-table, each pair normally embracing a block and one pair of said parts embracing also the neck-mold, a plurality of mouth-and-throat-molds mounted movably in the guideways of the mold-table, one in each and normally extending up through the adjacent block to rest in the neck-mold, each mouth-and-throat-mold having a relatively small upper end portion that has a fillet at the lower end thereof for coöperating with the neck-mold to shape the lip or extremity of the bottle neck, means for locking or unlocking the mold-table with a pair of the mold-parts opposite the pillar, means mounted on the pillar for locking the mold-parts together, means for moving up and holding the mouth-and-throat-mold at rest in normal position in the neck-mold on rotation of the mold-table to bring the mouth-and-throat-mold opposite the pillar, and a blow-head mounted adjacently to the pillar and movable to the pair of parison-mold-parts thereat.

23. In bottle-producing apparatus, the combination of an upright mouth-and-throat-mold comprising a cylindrical body portion having a fillet near its upper end and a tapering end portion extending from the fillet, a stem portion extending from the body portion, and a shank extending from the stem, said mold having a stop collar thereon; a bench-top, a guide-rail on the bench-top, a mold-table rotative on the bench-top and extending over the guide-rail, the mold-table having a guideway therein guiding said stem portion, an annular block mounted on the mold-table and having a counter-bore in the under side thereof to receive and stop said collar on upward movement of said mouth-and-throat-mold, said mold-table on rotation moving said shank onto said guide-rail to raise and support said mouth-and-throat-mold at rest above said block, a parison-mold mounted on the mold-table and normally embracing said block, and a neck-mold mounted removably on said block to receive and coöperate with said mouth-and-throat-mold.

24. In bottle-producing apparatus, the combination of a bench, a mold-table rotative on the bench, a parison-mold mounted on the mold-table, a neck-mold mounted removably on the mold-table in the parison-mold, a parison-clipper and a blow-head mounted at two different working stations on the bench adjacent the mold-table, a curved rail on the bench extending between and past the stations of the parison-clipper and the blow-head and under the mold-table, the rail having inclined end portions, an inverted rail supported above the terminal inclined end portion beyond the blow-head station, and a mouth-and-throat-mold mounted movably in the mold-table and having a roller thereon to be moved into contact with the curved rail and also with the inverted rail.

25. In bottle-producing apparatus, the combination of a bench, a valve member having a port therein and mounted fixedly on the bench, a mold table rotative on the bench in contact with the valve member and having a plurality of guideways therein, the mold-table having also a plurality of air-ducts therein extending from the guideways to the portion thereof that is in contact with the valve member, the outer orifices of the air-ducts being brought successively by the mold-table to and past the port in the valve member, annular blocks on the mold-table, one at each guideway, parison-molds mounted on the mold-table and each normally embracing one of the blocks, neck-molds on the blocks, upright mouth-and-throat-molds, each mounted movably in a different one of the guideways and blocks, means for temporarily supporting the mouth-and-throat-molds at rest in elevated position and permitting them to be lowered, and means for conducting air from the inner orifices of the air-ducts to and above the tops of the mouth-and-throat-molds when lowered.

In testimony whereof, we affix our signatures in presence of two witnesses.

JOSEPH B. GRAHAM.
FRANK R. MILLER.

Witnesses:
S. M. FIELD,
W. F. O'BRIAN.